(12) United States Patent
Corbin (10) Patent No.: US 11,406,099 B2
(45) Date of Patent: Aug. 9, 2022

(54) ANIMAL BARRIER FOR RAILROAD TRACKS

(71) Applicant: Lance Corbin, Lake City, FL (US)

(72) Inventor: Lance Corbin, Lake City, FL (US)

(73) Assignee: Lance Corbin, Lake City, FL (US)

( * ) Notice: Subject to any disclaimer, the term of this patent is extended or adjusted under 35 U.S.C. 154(b) by 53 days.

(21) Appl. No.: 16/789,059

(22) Filed: Feb. 12, 2020

(65) Prior Publication Data

US 2021/0244013 A1  Aug. 12, 2021

(51) Int. Cl.
*A01M 29/30* (2011.01)
*E01B 26/00* (2006.01)

(52) U.S. Cl.
CPC .............. *A01M 29/30* (2013.01); *E01B 26/00* (2013.01)

(58) Field of Classification Search
CPC .......... E01B 26/00; E01B 17/00; E01B 15/00; E01B 16/00; E01B 16/005; A01M 29/30; A01M 29/06; A01K 3/00; A01K 2003/007; A01K 15/04
USPC ................. 256/14, 17, 18; 238/379, 105
See application file for complete search history.

(56) References Cited

U.S. PATENT DOCUMENTS

2015/0298443 A1* 10/2015 Hundley ................. B32B 37/02
2016/0208442 A1* 7/2016 Herzog ................... E01B 26/00

OTHER PUBLICATIONS

"Curved Flanges No Problem for This Punch Press", Brad Kuvin, Nov. 1, 2017, https://www.metalformingmagazine.com/article/?/cnc-punching/presses-and-machines/curved-flanges-no-problem-for-this-punch-press (Year: 2017).*
Dolasia, M.; Special Tunnels Save Turtles From Train Deaths in Japan; DOGOnews, Dec. 13, 2015; 4-pages.
Kornilev et al., Between a Rock and a Hard Place: Responses of Eastern Box Turtles (*Terrapene carolina*) When Trapped Between Railroad Tracks; Herpetological Review, 2006, vol. 37, No. 2, pp. 145-148.

* cited by examiner

*Primary Examiner* — Joshua J Michener
*Assistant Examiner* — Henry Hooper Mudd
(74) *Attorney, Agent, or Firm* — Stinson LLP (57) ABSTRACT

An animal barrier for inhibiting the movement of small animals along first and second rails of one or more railroad tracks includes an animal stop having an animal stop face to be positioned between the first and second rails to inhibit the movement of the small animals along the first and second rails. The animal stop face has opposite first and second sides to be positioned adjacent the first and second rails, respectively, to inhibit the movement of the small animals between the animal stop face and the first and second rails. A support is coupled to the animal stop face and is to be secured to at least one of a railroad bed or a railroad tie to position and hold the animal stop face between the first and second rails.

15 Claims, 5 Drawing Sheets

ANIMAL BARRIER FOR RAILROAD TRACKS

FIELD

The present disclosure generally relates to animal barriers, and, more particularly, to animal barriers for railroad tracks.

BACKGROUND

Railroad tracks, as generally known, are used by trains for transportation. Railroad tracks frequently and typically extend through the natural habit of various animals. The rails of the railroad tracks can form physical barriers that smaller animals, such as turtles, hedgehogs, etc., are unable to cross. As a result, railroad tracks can be lethal for these smaller animals that become trapped by the rails, where they can be susceptible to predation, physiological stress (e.g., overheating), starvation (lack of food and/or water) and death.

Other railroad track configurations can also provide unintentional traps for these small animals, especially turtles which generally cannot walk backwards. For example, the acute angles formed by the X or V shaped railroad track intersections can trap turtles. In another example, the space between rails at a railroad switch can trap turtles, potentially preventing the switch from operating (e.g., closing) correctly which can lead to train derailment.

Points where roads intersect railroad tracks (e.g., railroad crossings) provide unintentional entry points for these small animals to enter the railroad tracks and become trapped between the rails. Generally, the road is at the same height as the rails of the railroad tracks, allowing the small animals to cross the rails, while also having slopped edges providing a relatively smooth and easy transition for animals between the road and the ground. Small animals can become trapped between the rails if the small animals, walking on the road, do not continue along the road (crossing the railroad tracks) but, instead, move off the road and in-between the rails of the railroad tracks.

Significantly, trapped animals can present a danger to vehicles traveling on the railroad tracks. Small animals that cannot escape the rails because of movement limitations can become caught or stuck in track switches blocking the switch and resulting in train and railcar derailment.

SUMMARY

In one aspect, the present disclosure is directed to an animal barrier for inhibiting the movement of small animals along first and second rails of one or more railroad tracks. The animal barrier includes an animal stop having an animal stop face configured to be positioned between the first and second rails to inhibit the movement of the small animals along the first and second rails. The animal stop face has opposite first and second sides and a length extending between the first and second sides. The length corresponds to a distance between the first and second rails such that when the animal stop face is positioned between the first and second rails the first and second sides are positioned adjacent the first and second rails, respectively, to inhibit the movement of the small animals between the animal stop face and the first and second rails. A support is coupled to the animal stop face and is configured to be secured to at least one of a railroad bed, a ground, the first and second rails or a railroad tie to position and hold the animal stop face between the first and second rails.

In another aspect, the present disclosure is directed to a method for inhibiting the movement of small animals along first and second rails of one or more railroad tracks. The method includes positioning a railroad animal barrier between the first and second rails. The railroad animal barrier includes an animal stop face configured to inhibit the movement of the small animals along the first and second rails. The animal stop face has opposite first and second sides and a length extending between the first and second sides. The length corresponds to a distance between the first and second rails such that the first and second sides are positioned adjacent the first and second rails, respectively, when the railroad animal barrier is positioned between the first and second rails to inhibit the movement of the small animals between the animal stop face and the first and second rails. The method includes blocking the movement of the small animal along the first and second rails with the animal stop face.

Other objects and features will be in part apparent and in part pointed out hereinafter.

BRIEF DESCRIPTION OF THE DRAWINGS

Corresponding parts are indicated by corresponding reference characters throughout the several views of the drawings.

DETAILED DESCRIPTION

Figure 1:
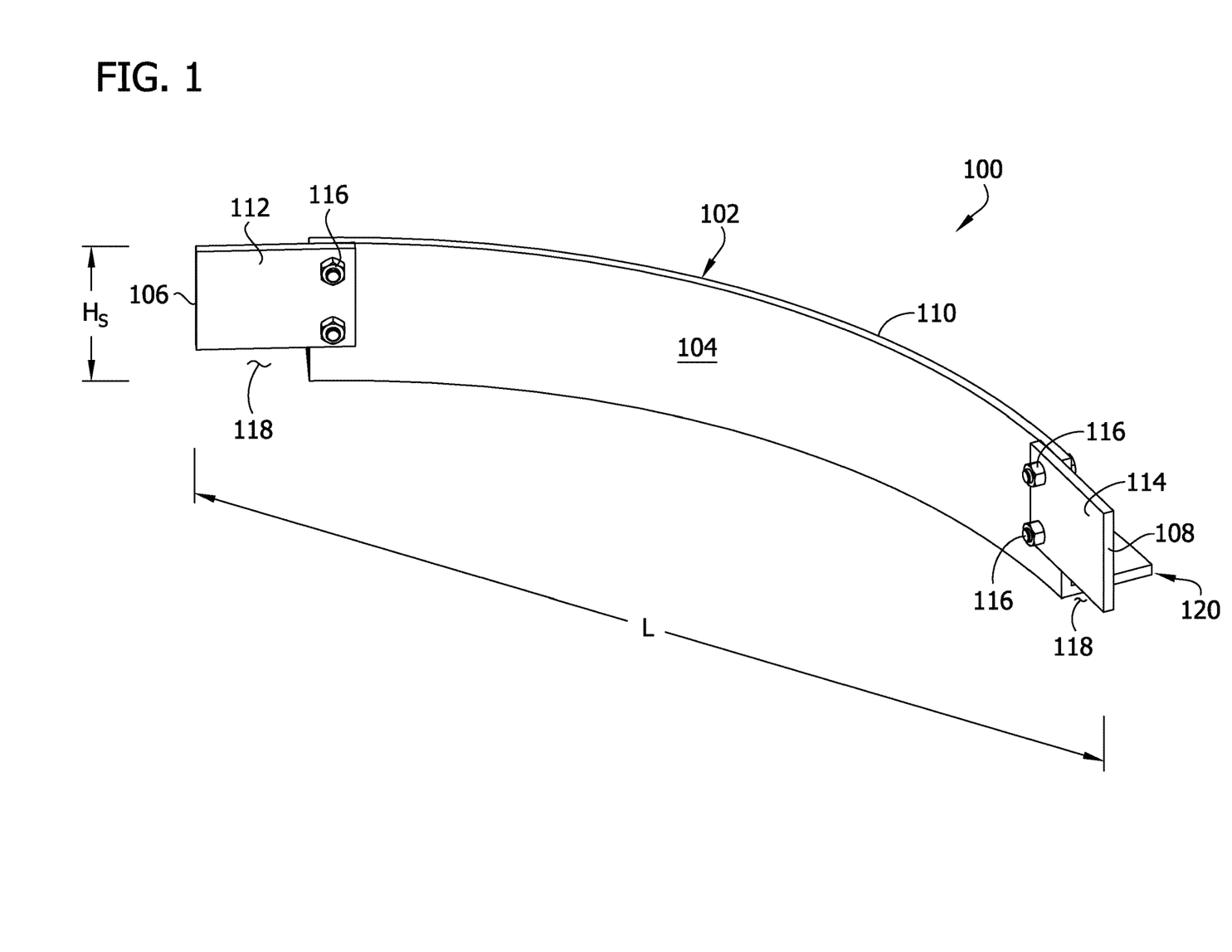
FIG. 1 is a front perspective of an animal barrier according to one embodiment of the present disclosure.
Figure 2:
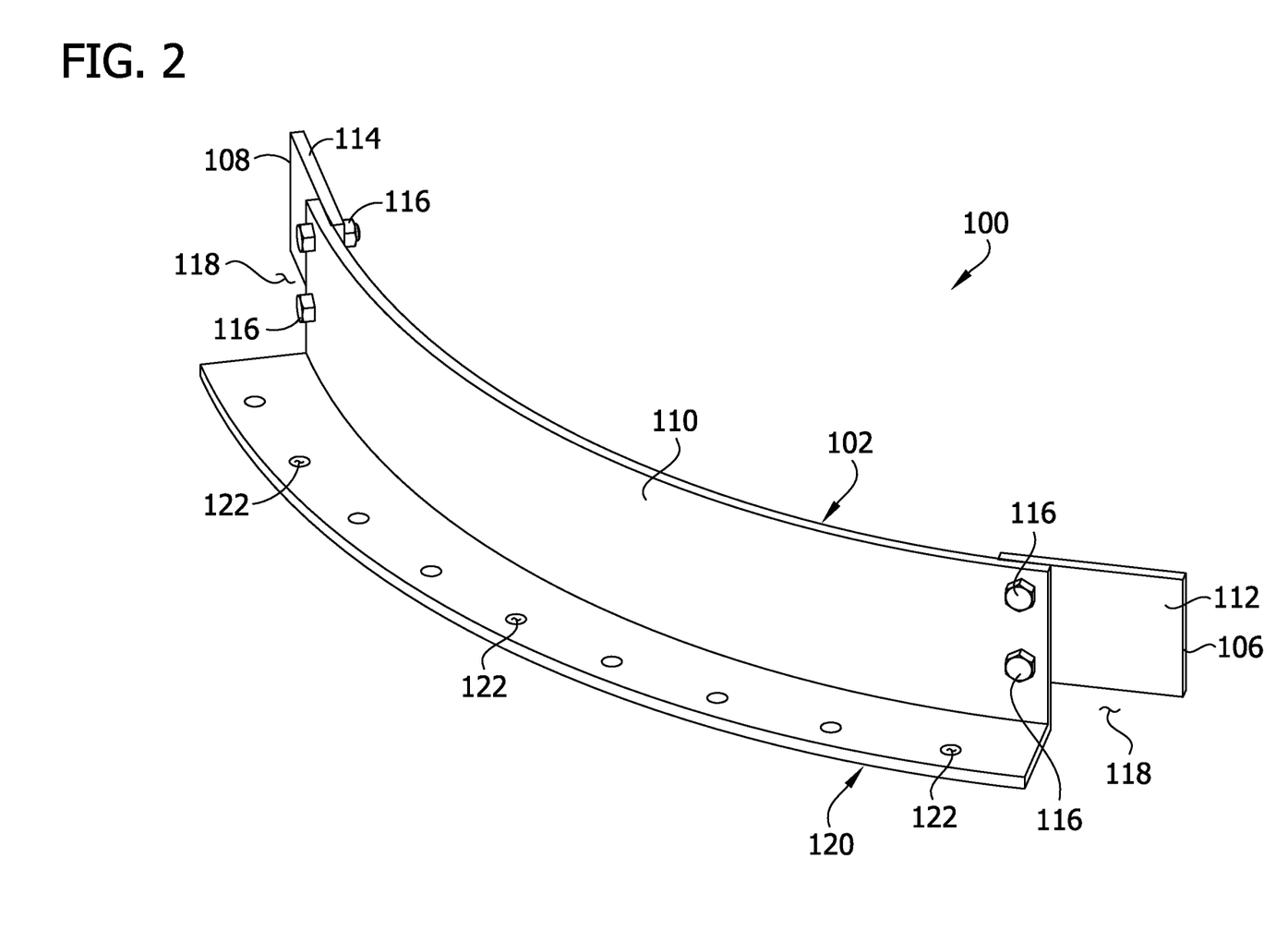
FIG. 2 is a rear perspective of the animal barrier.
Figure 3:
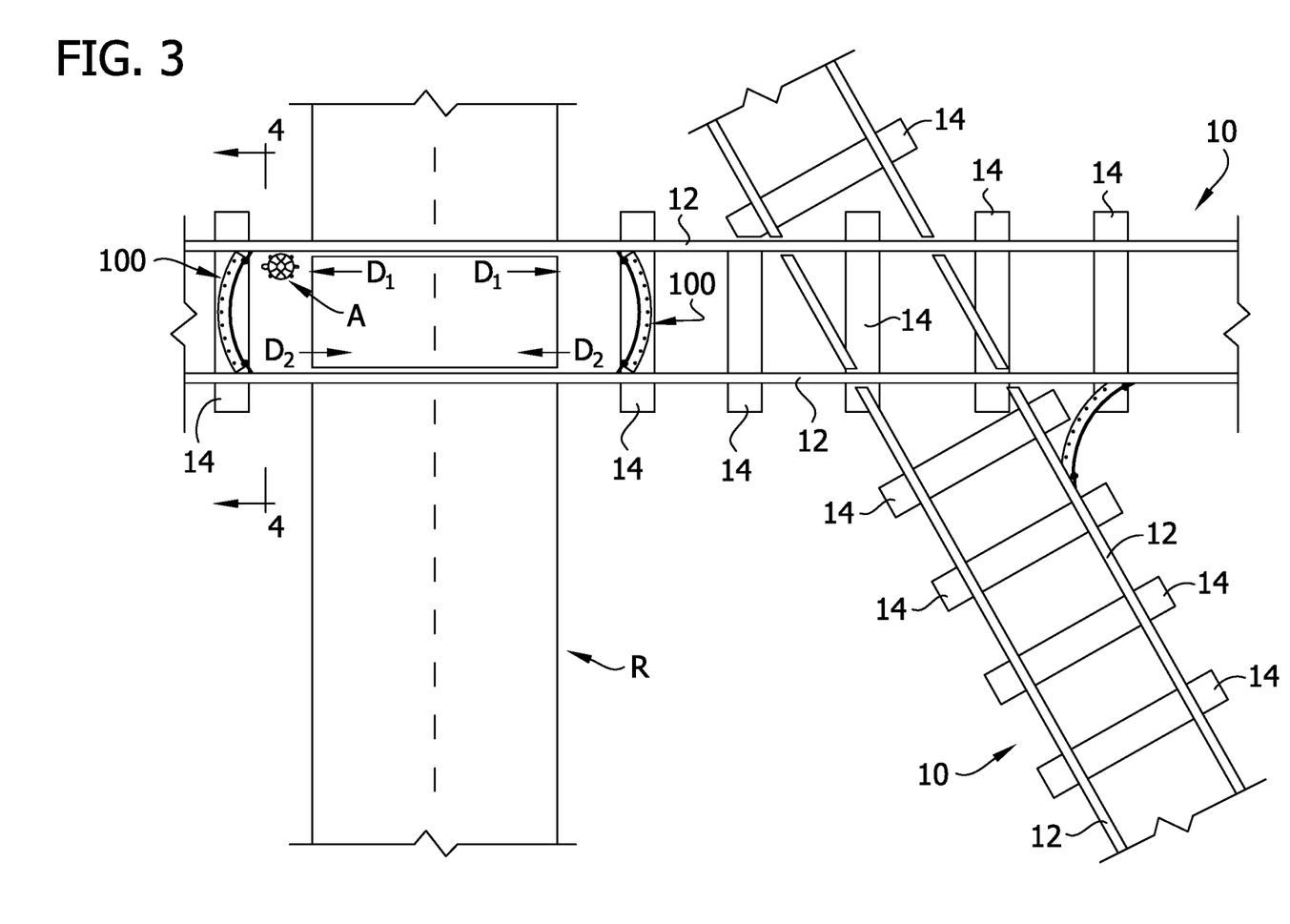
FIG. 3 is an illustration of animal barriers of FIG. 1 installed along railroad tracks.

Referring to FIGS. 1-4, an animal barrier (e.g., a railroad animal barrier) constructed according to the principles of the present disclosure is generally indicated at 100. The animal barrier 100 is used to inhibit or prevent small animals A, such as turtles (FIG. 3), from becoming trapped by one or more railroad tracks 10 by blocking and/or re-directing the animal's movement. The animal barrier 100 inhibits the movement of (e.g., is a physical obstacle to) the small animals A along the first and second rails 12 of one or more railroad tracks 10. As illustrated in FIG. 3, the first and second rails 12 can be part of the same railroad track 10 or different railroad tracks. The animal barrier 100 can be positioned (e.g., used) at railroad crossings, railroad intersections and/or railroad switches to prevent small animals A from becoming trapped by the rails at these locations. However, it is understood the animal barrier 100 can be used at other locations and positions of a railroad track 10. As used herein, the term inhibit refers to blocking, preventing, stopping, restricting, impeding hindering, re-directing, restraining, obstructing and/or stifling the movement of the small animal A.

Figure 4:
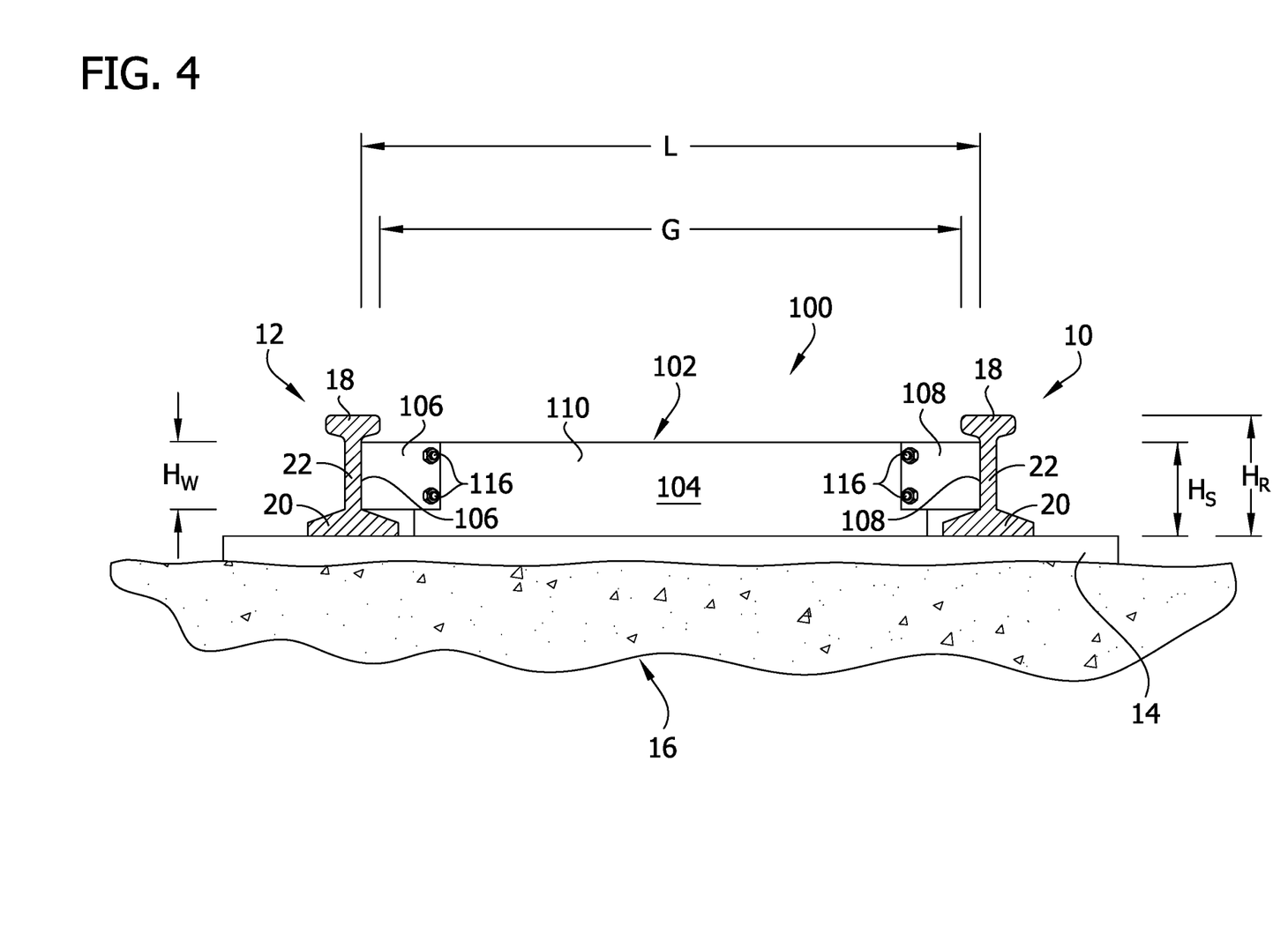
FIG. 4 is a cross-section of the railroad tracks taken through line 4-4 of FIG. 3.

Referring to FIGS. 3 and 4, the railroad track 10 includes a pair of spaced apart first and second rails 12. The rails 12 are mounted on and secured to a plurality of railroad ties or sleepers 14, which are supported by, and/or embedded in, the railroad bed or ballast 16 (FIG. 4). The railroad bed 16 is typically gravel. Each rail 12 includes a head 18, a foot 20 and a web 22 extending between the head and the foot. The rail 12 has a height $H_R$ and the web 22 has a height $H_W$, which is less than the height of the rail. The railroad track 10 has a gauge G (e.g., the distance between the two rails 12). In the United States, the typical (e.g., standard) gauge G is about 4' 8.5" (e.g., about 4 feet 8.5 inches) or a range of about 4' 6" to 4' 10". However, it is understood that the animal barrier 100 can be used with railroad tracks 10 of any gauge G. For example, the animal barrier 100 can be used with railroad tracks 10 having a gauge G of about 5' 6" to 5' 0" (e.g., broad gauge), about 3' 6" to 3' 0" (e.g., metre gauge), or about 2' 6" to 2' 0" (e.g., narrow gauge).

Referring to FIGS. 1 and 2, the animal barrier 100 includes an animal stop 102 having an animal stop face 104 configured to be positioned between the first and second rails 12 (FIG. 3) to inhibit the movement of the small animals A along the first and second rails. The animal stop 102, and specifically the animal stop face 104, comes into contact with the small animals A to block any further movement of the small animals along the rails 12. For reasons described below, preferably the animal stop face 104 is arcuate. The animal stop face 104 has opposite first and second sides 106, 108 and a length L extending between the first and second sides. The length L corresponds to the gauge G (e.g., distance) between the first and second rails 12 such that when the animal stop face 104 is positioned between the first and second rails, the first and second sides 106, 108 are positioned adjacent to the first and second rails, respectively. This inhibits the movement of the small animals A between the animal stop face 104 and the first and second rails 12.

The length L of the animal stop face 104 will preferably be larger than the gauge G of the railroad tracks 10 to compensate for the extra distance between the inner side of the head 18 of the rail 12 (from which the gauge is measured) and the inner side of the web 22, as shown in FIG. 4. Preferably, when the animal stop 100 is installed between the rails 12, a distance between the first and second sides 106, 108 and the first and second rails 12 (specifically, the webs 22), respectively, is equal to or less than about two inches, to prevent the small animals A from passing therebetween. In one embodiment, the first and second sides 106, 108 of the animal stop face 104 engage the first and second rails 12, respectively, when the animal barrier 100 is installed, as described in more detail below. For example, in one embodiment, the length L may be equal to or less than about 60 inches, more preferably about 58.75 inches, which generally corresponds to standard gauge G (e.g., 4' 8.5") railroad tracks 10. It is understood the length L can be adjusted to fit the gauge G of the railroad track 10 the animal barrier 100 is installed on.

The animal stop 102 may be a single, integral piece or may be multiple pieces coupled together. For example, in the illustrated embodiment, the animal stop 102 includes a central stop 110 and opposite first and second tabs 112, 114 extending laterally outward from the central stop. In this embodiment, the central stop 110, first tab 112 and second tab 114 define the animal stop face 104 (e.g., each defines a portion of the animal stop face). Fasteners 116, such as bolts, may be used to connect the tabs 112, 114 to the central stop 110, although other ways of attaching the tabs to the central stop are within the scope of the present disclosure. For example, in one embodiment, the tabs 112, 114 are adjustable. An example of such an animal barrier is generally indicated at 100' in FIG. 5. Animal barrier 100' is similar to animal barrier 100 and, thus, for ease of comprehension, where animal barrier 100 includes similar or identical elements to that of animal barrier 100, identical reference numbers are used. In this embodiment, the fasteners 116 extend through slots 115, 117 in the tabs 112, 114 and central stop 110, respectively, to connect the tabs to the central stop. Slots 115 are generally horizontal and permit the tabs 112, 114 to move inward or outward relative to the central stop 110. In this manner, the length L of the animal stop face 104 is adjustable. Each end of the central stop 110 includes (e.g., defines) a pair of slots 115, each one receiving one of the fasteners 116 used to connect the tabs 112, 114 to the central stop. Each slot 117 is generally vertical and permits the tabs 112, 114 to move vertically (e.g., up or down) relative to the central stop 110. In this manner, the tabs 112, 114 can be positioned to extend between the head 18 and foot 20 of the rail 12. Each tab 112, 114 includes one slot 117 adjacent one end thereof for receiving the fasteners 116 used to connect the tabs to the central stop 110. The adjustability of the tabs 112, 114 allows the animal barrier 100' to be used with and confirm to railroad tracks 10 (e.g., rails 12) of different configurations. In one embodiment, the animal barrier 100' may only include the horizontal slots 115 or vertical slots 117. In one embodiment, the tabs 112, 114 may include the horizontal slots 115 and the central stop 110 may include the vertical slots 117.

Referring back to FIGS. 1 and 2, the first tab 112 defines the first side 106 of the animal stop face 104 and the second tab 114 defines the second side 108 of the animal stop face. In the illustrated embodiment, the first and second tabs 112, 114 are configured to engage the rails 12, specifically the webs 22 thereof. In other words, the first and second sides 106, 108 are configured to engage the rails 12. This eliminates any space between the first and second sides 106, 108 of the animal stop face 104 and the rails 12 to prevent any small animals A from passing in-between the animal barrier 100 and the rails. Preferably, the tabs 112, 114 are flexible (e.g., resiliently deflectable or deformable). This ensures the tabs 112, 114 will engage the rails 12, as described below, and allows the tabs to flex and move to accommodate any movement (e.g., vibrations) of the rails as a train (or other vehicle traveling on the track) travels along the railroad tracks 10. The central stop 110 may be made of generally any rigid material, such as metal or rigid plastic. The tabs 112, 114 may be made of generally any flexible material such as flexible plastic, rubber or even thin metal (e.g., thin sheet metal). The use of other suitable materials are within the scope of the present disclosure. In one embodiment, the length of the tabs 112, 114 may be about nine inches.

The animal stop 102 has a height that is small enough that the animal stop 102 will not get hit by a train traveling along the railroad tracks 10. In particular, the animal stop face 104 has a height $H_S$ (e.g., a height of the animal stop 102) that is, preferably, about equal to or less than the height $H_R$ of the first and second rails 12. For example, the animal stop face 104 can have a height $H_S$ that is equal to or less than about eight inches, which may, in one railroad track 10 configuration, correspond to the height $H_R$ of the rails 12, or more preferably a height of about 7¼ inches. Of course, the height $H_S$ of the animal stop face 104 must be large enough to provide a barrier to the small animals A to prevent the small animals from climbing over the animal stop 102. Accordingly, preferably the height $H_S$ of the animal stop face 104 is greater than or equal to about half the height $H_R$ of the rails 12. In the illustrated embodiment, in order to permit the first and second sides 106, 108 to engage the webs 22 of the first and second rails 12, respectively, the first and second sides have a height that is generally equal to or less than the height $H_W$ of the web of the first and second rails. Specifically, the first and second tabs 112, 114 have a height at the first and second sides 106, 108 of the animal stop face 104 that is about equal to or less than the height $H_W$ of the web 22. This allows the first and second tab 112, 114 (e.g., animal stop face 104) to extend between the head 18 and foot 20 of each rail 12 to engage the web 22. For example, the first and second sides 106, 108 can have a height that is equal to or less than about five inches, which may, in one railroad track 10 configuration, correspond to the height $H_W$ of the webs 22. In one embodiment, the first and second sides 106, 108 may have a height of about three inches or, more preferably, a height of about 4¼ inches. As shown in FIG. 4, the first and second tabs 112, 114 are disposed on the central stop 110 such that the first and second tabs are aligned (e.g., horizontally aligned) with the webs 22 of the rails 12. The animal barrier 100 may have a depth that is equal to or less than about eight inches, in order to be placed entirely on a railroad tie 14.

Figure 5:
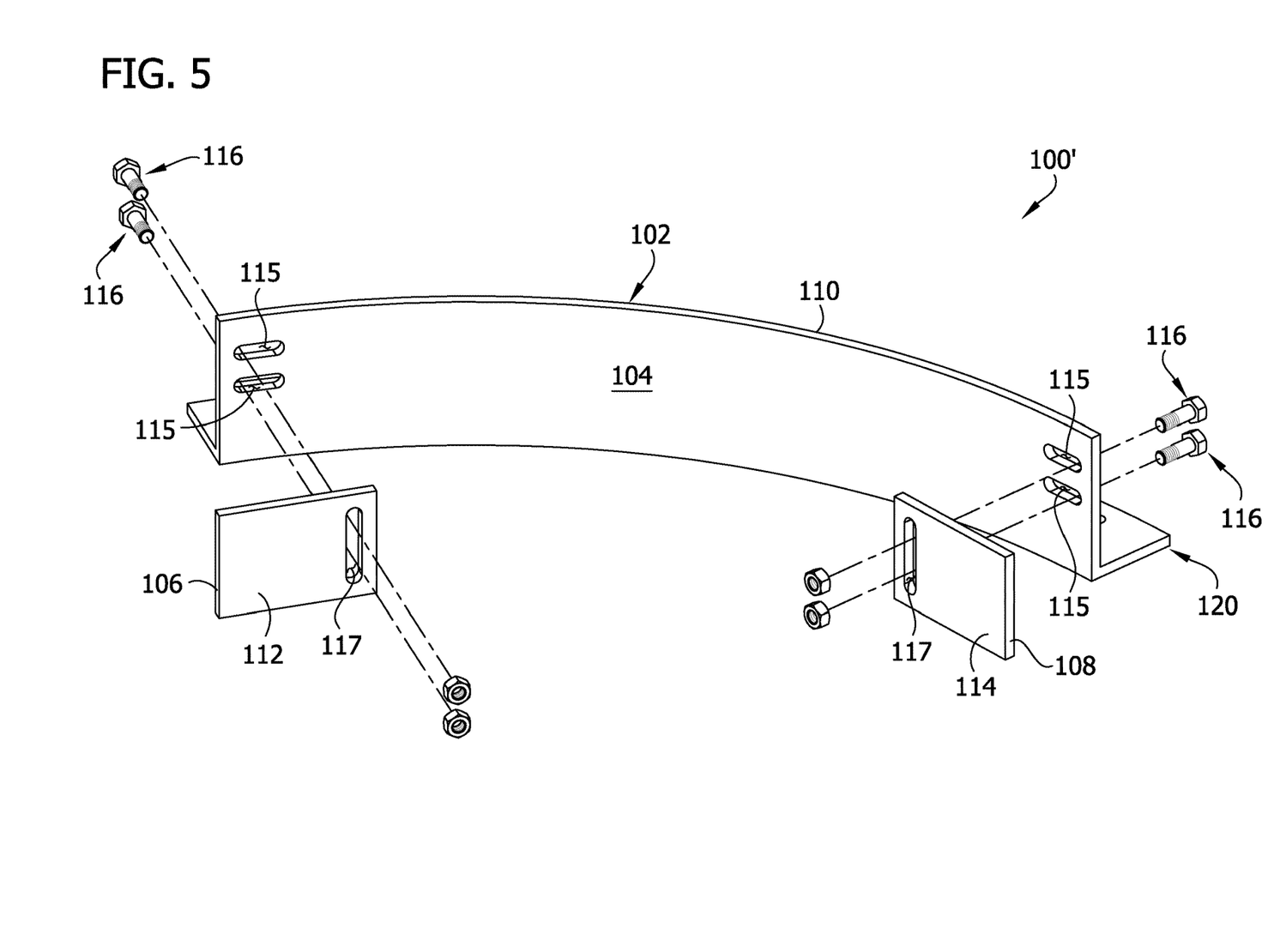
FIG. 5 is an exploded perspective of another embodiment of an animal barrier according to the present disclosure.

In one embodiment, the animal stop 102 may include a height adjustment flange or plate (not shown) to adjust the height $H_S$ of the animal stop. The height adjustment plate has a size and shape that generally corresponds to the size and shape of the central stop 110, specifically a front surface thereof (e.g., the surface of the central stop that defines a portion of the animal stop face 104. For example, the height adjustment plate may have an arcuate shape to match the arcuate shape of the central stop 110. In this embodiment, the height adjustment plate defines at least a portion of the animal stop face 104. The height adjustment plate can include opposite vertical slots, similar to slots 117 of animal barrier 100', adjacent each end of the plate that each receive one or more fasteners 116 to connect the height adjustment plate to the central stop 110. The fasteners 116 used to connect the height adjustment plate may be the same fasteners used to connect the tabs 112, 114 to the central stop 110. In one embodiment, the height adjustment plate may be disposed between the central stop 110 and the tabs 112, 114. The vertical slots of the height adjustment plate allow the height adjustment plate to move up or down relative to the central stop 110, similar to the tabs 112, 114 of animal barrier 100' (FIG. 5A), to adjust the height $H_S$ of the animal stop 102, and more specifically, the animal stop face 104. The adjustability of the height $H_S$ of the animal stop 102 allows the animal barrier 100, 100' to be used with and confirm to railroad tracks 10 (e.g., rails 12) of different configurations.

The animal stop 102 and animal stop face 104 may include one or more notches or cutouts 118 sized and shaped to accommodate one of the head 18 or foot 20 of the rail 12. The notches 118 are disposed at either the top or bottom of the animal stop face 104 and at either side 106, 108 (e.g., at the corner of the animal stop face). In the illustrated embodiment, the animal stop 102 includes two notches 118 disposed at the bottom of the animal stop face 104 at each side 106, 108 to accommodate the foot 20 of each rail 12. The animal stop 102 may also include two notches (not shown) disposed at the top of the animal stop face 104 at each side 106, 108 to accommodate the head 18 of each rail 12. The notches 118 allow the animal stop 102, and in particular the animal stop face 104, to be in a close fitting relationship with the rails 12 when installed on the railroad tracks 10 (FIG. 4). In one embodiment, the notches 118 may be formed by spacing the lower end of the first and second tabs 112, 114 from the lower end of the central stop 102. For example, the lower end of the first and second tabs 112, 114 can be disposed about one inch vertically above the lower end of the central stop 102.

Still referring to FIGS. 1-4, the animal barrier 100 includes a support 120 configured to secure the animal barrier in position on the railroad tracks 10. Specifically, the support 120 is configured to be secured to at least one of the railroad bed 16 (broadly, the ground), the first and second rails 12, or the railroad tie 14 to position and hold the animal stop face 104 between the first and second rails 12. In the illustrated embodiment, the support 120 includes at least one fastener opening 122 configured to receive a fastener (e.g., nail, screw, bolt, stake, spike, etc.) to secure the support to either the railroad bed 16 or the railroad tie 14. For example, the support 120 can include two, three, four, five, etc. fastener openings 122. The support 120 has a generally flat bottom surface configured to engage the railroad bed 16 or railroad tie 14. The sides of the support 120 are, preferably, spaced inward from the first and second sides 106, 108, respectively, of the animal stop face 104 to accommodate the foot 20 of each rail 12. In the illustrated embodiment, the support 120 is a generally planar flange. The generally planar flange 120 extends from the lower end of the animal stop 102. In this embodiment, the support 120 defines a support plane with the animal support face 104 being generally perpendicular to the support plane. In the illustrated embodiment, the animal stop 102 is a flange, such as an arcuate flange. In this embodiment, the animal stop 102 extends upward from an edge of the support 120. Other methods of securing the animal barrier 100 to the railroad tracks 10 are within the scope of the present disclosure. For example, the support 120 can be connected to the rails 12 with fasteners or by welding. Moreover, instead of or in addition to the support 120, the first and second tabs 112, 114 (broadly, the first and second sides 106, 108) may be secured to the rails 12, such as by fasteners or welding. The support 120 can be made from the same material as the animal stop 102.

As shown in FIG. 3, the animal barrier 100 is installed along the railroad tracks 10 at locations where the small animals A can become trapped between the rails 12. For example, the animal barrier 100 can be installed at railroad crossings where a road R crosses the railroad tracks 10 and at the acute angles formed by railroad track intersections, both shown in FIG. 3. The animal barrier 10 may also be positioned at railroad switches (not shown). As mentioned above, the length L of the animal stop face 104 corresponds to the gauge G of the railroad tracks 10. When the animal barrier 100 includes the flexible first and second tabs 112, 114, preferably, the length L of the animal stop face 104 is larger than the distance between the inner sides of the webs 22 of the rails 12. For example, as mentioned above, for standard gauge G railroad tracks 10, the length L may be equal to or less than about 60 inches, or more preferably, about 59 inches. The length L being larger than the distance between the inner sides of the webs 22, results in the first and second tabs 112, 114 (e.g., the first and second sides 106, 108) being deflected inward by the webs of the first and second rails 12, respectively, when the animal barrier 100 is installed on the railroad tracks 10. As a result of the deflection, the first and second tabs 112, 114 (e.g., the first and second sides 106, 108) are biased against the webs 22 of the rails 12 to eliminate any space between the first and second sides and the rails, as shown in FIG. 4.

Referring to FIGS. 3 and 4, the animal stop face 104 is configured to inhibit the movement of the small animals A in a first direction D1 and to, preferably, direct the small animals in a second direction D2. The second direction D2 may be generally opposite the first direction D1, although other configurations are within the scope of the present disclosure. Preferably, the animal stop face 104 is arcuate, or more specifically, is concave. The arcuate animal stop face 104, as illustrated, defines a curved path used to direct the small animals generally back toward the direction from which they came or away from a location or area where the small animal can become trapped, stuck, caught, etc. between two rails 12.

For railroad crossings, an animal barrier 100 is placed adjacent to either side of the road R between the rails 12. Each animal barrier 100 prevents the small animals A from traveling along the rails 12 and becoming trapped. When a small animal A enters the railroad tracks 10 from the road R, the animal barrier 100 prevents the small animal from continuing to move between the rails 12. The animal barrier 100 forms a dead end, forcing the small animal A to turn around and go back to the road R. In addition, generally, the small animals A walk right next to (e.g., hug) one of the rails 12 (e.g., not in the middle of the tracks 10) when the small animals move along the tracks 10. Accordingly, when the small animal A reaches and comes into the contact with the animal barrier 100 (specifically, the animal stop face 104), the small animal will generally continue to move along the animal stop face. The arcuate animal stop face 104 does not form a sharp corner (e.g., an acute angle) with each rail 12 which may stop the movement of the small animal A, forcing the small animal to pick another direction at random to travel in. Instead, the arcuate animal stop face 104 forms a gentle transition with the rail 12 (e.g., the animal stop face forms a generally obtuse angle with the rails 12 at the first and second sides 106, 108, respectively). When the small animal A reaches one of the sides 106, 108 of the animal stop face 104, generally the small animal will continue to move along and hug the animal stop face like they previously did with the rail 12, because there is no sharp corner. The arcuate animal stop face 104 defines a curved path which guides the small animals A from traveling along one rail 12 in the first direction $D_1$, to traveling along the other rail in the second direction $D2$ (e.g., back to the road R). Thus, animal barrier 100 helps direct the small animals A in a direction where they can walk back onto the road R and leave the railroad tracks 10.

The animal barrier 100 operates in the same manner when placed at other positions on the railroad track 10. For example, as shown in FIG. 3, an animal barrier 100 is positioned between the rails 12 of railroad tracks 10 that form an acute angle. The animal barrier 100 prevents small animals A from reaching the intersection of the two rails 12 and, as described above, directs the small animals in another direction. Likewise, the animal barrier 100 can be used to prevent the small animals A from reaching the space between rails 12 of a switch and direct the small animals away from the switch.

It will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the claims, it is intended that all matter contained in the above description and shown in the accompanying drawings shall be interpreted as illustrative and not in a limiting sense.

What is claimed is:

1. A railroad animal barrier for inhibiting the movement of animals along first and second rails of one or more railroad tracks, the animal barrier comprising:
    an animal stop having an animal stop face configured to be positioned between the first and second rails to inhibit the movement of the animals along the first and second rails, the animal stop face being arcuate, the animal stop face having a central stop and opposite first and second tabs extending laterally outward from the central stop, wherein the opposite first and second tabs have a height at the first and second sides of the animal stop face about equal to or less than a height of a web of the first and second rails and wherein the height of the opposite first and second tabs at the first and second sides of the animal stop face is equal to or less than about 5 inches, the animal stop face having opposite first and second sides and a length extending between the first and second sides, the length corresponding to a distance between the first and second rails such that when the animal stop face is positioned between the first and second rails the first and second sides are positioned adjacent the first and second rails, respectively, to inhibit the movement of the animals between the animal stop face and the first and second rails; and
    a support coupled to the animal stop face and configured to be secured to at least one of a railroad bed, a ground, the first and second rails, or a railroad tie to position and hold the animal stop face between the first and second rails.

2. The railroad animal barrier of claim 1, wherein the animal stop face is configured to inhibit the movement of the animals in a first direction and to direct the animals in a second direction that is generally opposite the first direction.

3. The railroad animal barrier of claim 1, wherein the animal stop face is concave.

4. The railroad animal barrier of claim 1, wherein the first and second sides of the animal stop face are configured to engage the first and second rails, respectively.

5. The railroad animal barrier of claim 4, wherein the first tab defines the first side of the animal stop face and the second tab defines the second side of the animal stop face.

6. The railroad animal barrier of claim 5, wherein the first and second tabs are resiliently deflectable.

7. The railroad animal barrier of claim 6, wherein the first and second tabs are configured to engage a web of the first and second rails.

8. The railroad animal barrier of claim 1, wherein the animal stop face has a height about equal to or less than a height of the first and second rails.

9. The railroad animal barrier of claim 7, wherein the height of the animal stop face is equal to or less than about 8 inches.

10. The railroad animal barrier of claim 1, wherein the animal stop is an arcuate flange.

11. The railroad animal barrier of claim 1, wherein the support includes at least one fastener opening configured to receive a fastener to secure the support to at least one of the ground or the railroad tie.

12. The railroad animal barrier of claim 11, wherein the support is a generally planar flange.

13. The railroad animal barrier of claim 1, wherein the length is equal to or less than about 60 inches.

14. The railroad animal barrier of claim 1, in combination with the first and second rails.

15. A method for inhibiting and re-directing the movement of animals along first and second rails of one or more railroad tracks, the method comprising:
- positioning a railroad animal barrier between the first and second rails, the railroad animal barrier including an animal stop face configured to inhibit the movement of the animals along the first and second rails, the animal stop face being arcuate, the animal stop face having opposite first and second sides and a length extending between the first and second sides, the length corresponding to a distance between the first and second rails such that the first and second sides are positioned adjacent the first and second rails, respectively, when the railroad animal barrier is positioned between the first and second rails to inhibit the movement of the animals between the animal stop face and the first and second rails; and
- blocking the movement of the animal along the first and second rails with the animal stop face by re-directing the animal in a direction that is generally away from a location along the first and second rails.

\* \* \* \* \*